United States Patent [19]

Mehta

[11] 4,036,657
[45] July 19, 1977

[54] HIGH IRON OXIDE HYDRAULIC CEMENT

[75] Inventor: Povindar K. Mehta, El Cerrito, Calif.

[73] Assignee: Reagents of the University of California, Oakland, Calif.

[21] Appl. No.: 598,411

[22] Filed: July 23, 1975

[51] Int. Cl.² .......................... C04B 7/02; C04B 7/04
[52] U.S. Cl. .................................... 106/89; 106/100; 106/103; 106/104
[58] Field of Search ................. 106/89, 100, 103, 104

[56] References Cited

U.S. PATENT DOCUMENTS

| 3,251,701 | 5/1966 | Klein | 106/100 |
| 3,677,781 | 7/1972 | Nickelsen et al. | 106/100 |

Primary Examiner—J. Poer
Attorney, Agent, or Firm—Phillips, Moore, Weissenberger, Lempio & Majestic

[57] ABSTRACT

Hydraulic cements having higher (about 5%) iron-oxide content and lower (43-57%) than the usual calcium-oxide content of Portland cements are disclosed. These high iron-oxide cements have normal setting times, but high early strengths that develop without resorting to fine grinding or steam curing. The cements can be produced with considerably less expenditure of energy than required for conventional Portland cements due to lower burning temperatures and reduction in the amount of calcium-oxide which requires the greatest energy input for preparation of the cements.

9 Claims, No Drawings

HIGH IRON OXIDE HYDRAULIC CEMENT

BACKGROUND OF THE INVENTION

Hydraulic cements principally containing calcium silicates are known as Portland cements. Portland cement concrete is among the most commonly used structural materials in the world. Annually about 600,000,000 tons of Portland cement was manufactured and utilized in the construction of all types of structures, including habitations, roadways, bridges, dams, etc.

General-purpose Portland cements consist essentially of 60–65% calcium-oxide, 20–24% silica, 4–8% alumina, and about 2–5% ferric oxide. Limestone, clay, shale, sandstone, bauxite and iron ore are among the raw materials used to produce a Portland cement product. Production of cement involves processing (burning) the raw material mixture at from about 2500° to 2900° F (1400°–1600° C), wherein the principal reactions in the heat treatment are as follows:

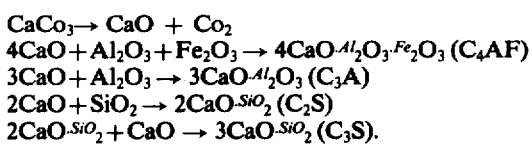

The expressions in parentheses indicate standard cement chemistry notations for the compounds formed on the right hand sides of the above equations. In this notation $C=CaO$, $S=SiO_2$, $A=Al_2O_3$, $F=Fe_2O_3$, $\bar{S}=SO_3$, and $H=H_2O$. Such notation may be utilized hereinafter in discussing various compounds noted in the specification.

In the cement production process, the high temperature heat-treatment or burning, yields sintered or clinkered material which is then pulverized, normally with 4–5% gypsum, to produce the final cement product. The gypsum is added to the clinker in the final grinding process for the purpose of controlling the setting time of the cement when it is later mixed with water during the construction process. General-purpose Portland cement (usually designated ASTM Type I) contains typically about 50%, $C_3S$, 25% $C_2S$, 12% $C_3A$, 8% $C_4AF$, and 5% $C\bar{S}$ (gypsum). Thus in Portland cement, the total amount of calcium silicates is about 75%, and the predominant silicate is $C_3S$.

The clinker of such general purpose Portland cement is generally ground to a fineness of about 3,500–4,000 cm²/g Blaine. The ground product is then bagged for warehousing and/or transportation to a concrete mixing plant. Such general-purpose Portland cements are required to meet ASTM standards, and exhibit 1800 psi and 2800 psi minimum compressive strength at 3 and 7 days, respectively, after hydration. The rate of strength (strength as a function of time) development is determined by standard ASTM procesure C109. The standard specification for Portland cement is covered by ASTM C150.

It will be appreciated that for many construction applications, the rate-of-strength development exhibited by Portland cements may be vitally important from an economic standpoint. Thus a Portland cement with a slow rate-of-strength development, or even a rate-of-strength development adequate to meet the ASTM specifications, will require support by forms during the period of time necessary to develop adequate strength to permit removal of the forms and undertake additional construction. Thus, lower rate-of-strength development slows construction, increases the inventory of forms, and increases labor costs. The economics of concrete construction is therefore directly affected by the rate-of-strength development. These strength development rates are inadequate for the precast, pre-stressed concrete industry products which often are required to acquire 3,000–4,000 psi strength at one day age.

In order to overcome the slow rate of strength development exhibited by general-purpose Portland cement, the industry has resorted to the production of high early strength Portland cement (ASTM type III), which consists of 55–70% $C_3S$, and is ground to 5,000–6,000 cm²/g Blaine. Such cements, which obviously require more energy for their production, exhibit compressive strengths of the order of 2,000–2,500 psi at one day age. The minimum ASTM specification for compressive strength of type III Portland cement is 1,800 psi at one day and 2,800 psi at three days. However, for purposes of prestressed and some precast concrete products, even the strength development rate of normally cured Type III Portland cement concrete is not adequate. Therefore, steam curing must be employed in order to develop the required strengths in a shorter period of time.

In the chemistry and technology of Portland cements, the compounds $C_3A$ and $C_4AF$ are generally considered to be unimportant with regard to their strength contribution to the cements. In addition, the compound $C_2S$ is capable of existing in two different crystalline forms, i.e., the gamma and the beta form. The gamma form is inert or non-hydraulic, while the beta form is slow to set and harden. The compound $C_3S$, however, is rapid hardening and a major contributor to the strength exhibited by conventional Portland cements. This is why when a high early strength Portland cement is desired, the current practice consists of modifying the compound composition of the cement by increasing the $C_3S$ content as described above.

In any event, it will be appreciated that the development of Portland cement having strength development rates even higher than those presently available would be of great economic benefit.

It should be further considered that the U.S. Department of Commerce has classified the cement industry as one of the top 10 highest energy consuming industries. The total energy required to produce one ton of Portland cement is about 1300 kwh. About 100–150 kwh is required as direct electrical energy for the unit operations of crushing and grinding the raw materials and pulverizing the clinker to cement. A major part of the energy consumption is, however, in the form of heat which is needed for the heat-treatment, i.e., burning, of the raw materials. In order to achieve the necessary chemical reactions, the raw materials must be heated to temperatures in the neighborhood of 2,600°–2,900° F. Depending upon whether a dry or a wet process of cement making is used, the heat energy can vary from 800 to about 1,400 Kcals/Kg of clinker produced.

On the basis of 60–65% CaO present in a general-purpose Portland cement clinker, about 450–500 Kcals of the total heat required is spent for the formation of CaO from $CaCO_3$. It is thus apparent that the heat required for the formation of calcium-oxide from calcium-carbonate is a major component of the total heat consumed in cement making. It is further apparent from their formulas, $C_3S$ and $C_2S$, that tricalcium silicate requires the most CaO, and therefore the greatest consumption of energy for its production. Also, as noted from the high temperature necessary to effect the desired chemical reactions, it will be apparent that another significant component of the total heat consumed for clinker making is the heat lost by radiation from the high temperature zone of the cement kiln where the burning temperatures can be as high as 2,900°–3000° F. The heat lost by radiation is proportional to the fourth power of absolute temperatures.

From the above, it is apparent that from the standpoint of energy conservation, any reduction in the total amount of calcium-oxide in the cement product and/or reduction of the burning zone temperatures during the cement making process would lead to a considerable saving in energy.

BRIEF DESCRIPTION OF THE INVENTION

It has now been determined that a high early strength hydraulic cement can be produced without including the high energy requiring $C_3S$ component therein; and further, which can be produced at burning temperatures in the region of about 2200° to about 2300° F (about 1200°–1260° C). The hydraulic cement compositions of the present invention further develop a very high early strength, i.e., 4000–5000 psi at one day age. Said cements exhibit normal setting times equivalent to general-purpose Portland cements, and are non-expansive; although they can be made expansive by suitable adjustment of the components thereof, or by intergrinding gypsum with the cement clinker.

As a composition, the high iron-oxide cements of the present invention comprise major amounts of tetracalcium aluminoferrite ($C_4AF$) from about 15 to about 65% by weight; with lesser amounts of tetracalcium trialuminosulfate ($C_4A_3\bar{S}$), from about 10 to about 20% by weight; and calcium sulfate ($C\bar{S}$), about 10 to about 15% by weight. The alumino ferrite phase, $C_4AF$, is actually present in the form of $C_2A$-$C_2F$ solid solution which may also contain sulfate and other ions. The use of the $C_4AF$ notation herein is for the purpose of easing computations of the potential compositions of the cements. In addition, the compositions may contain dicalcium silicate ($C_2S$) in amounts of from 0 to about 50% by weight.

In commercial practice, small amounts of impurities, usually present in naturally occurring raw materials can be expected to appear in the compositions. Such impurities normally encountered are for instance sodium oxide, potassium oxide, magnesium oxide, titanium oxide, and the like. However, it is also known that such small amounts of impurities can be tolerated without significant adverse effect on the setting and hardening characteristics of cement.

The process of producing the high iron-oxide cements is essentially identical with that utilized for the production of Portland cements in general, and involves crushing, grinding, proportioning and heat treating the raw materials to produce a sintered material, or clinker, which is finally pulverized in order to produce the ground cement product. It is significant that in the present process, the raw materials need only be subjected to burning temperatures in the neighborhood of 2,200° to 2,300° F. which temperature is about 500° F below the average burning temperatures customarily utilized in the production of Portland cements. It is also significant that, unlike Portland cements, no gypsum addition to the clinker is necessary for retarding the setting times of the cements disclosed herein.

The high iron-oxide cements of the invention are quite low in calcium oxide as compared with conventional Portland cements. Whereas the calcium oxide content of conventional Portland cements is in the neighborhood of from 60 to 65% by weight, the calcium oxide of the high iron-oxide cement of this invention are significantly lower, i.e., from about 43 to 57% by weight.

Additionally, as will be noted hereinafter, the calcium oxide that is formulated into the cements is almost entirely present in the combined form, i.e., in the compounds $C_4AF$, $C_4A_3\bar{S}$ and $C\bar{S}$, as revealed by the absence of uncombined CaO from X-ray diffraction analysis.

It is therefore an object of the invention to provide high iron-oxide cements that utilize significantly lower amounts of calcium oxide than the amounts contained in conventional Portland cements.

It is yet another object of the invention to provide high iron-oxide cements that can be produced with significant savings in energy.

It is still another object of the invention to provide high iron-oxide cements that do not contain tricalcium silicate ($C_3S$), which is the major component found in conventional Portland cements, and occurs in large amounts in high early strength Portland cements, Type III.

It is still another object of the invention to provide high iron-oxide hydraulic cements that are aesthetically pleasing in appearance.

Other objects and advantages of the invention will be apparent from the following description and claims appended hereto.

DETAILED DESCRIPTION OF THE INVENTION

As noted above, the high iron-oxide hydraulic cements of the invention comprise essentially $C_4AF$ (about 15 to about 65% by weight), $C_4A_3\bar{S}$ (from about 10 to about 20% by weight), and $C\bar{S}$ (from about 10 to about 15% by weight). In addition, $C_2S$ may be present in the compositions in amounts of from about 0 to 50% by weight. When present in the invention compositions, the $C_2S$ is essentially in the beta crystalline form. The gamma form is inert or non-hydraulic, and is therefore undesirable as a component in the cement composition.

The raw materials necessary to produce the high iron-oxide hydraulic cements, in terms of the oxides of the major constituents necessary to produce the high iron-oxide hydraulic cements, are iron-oxide, ($Fe_2O_3$); alumina ($Al_2O_3$); sulfate ($SO_3$); calcium oxide or lime (CaO); and when dicalcium silicate is included in the composition, silica ($SiO_2$).

Any available and abundant source of these oxides may be utilized as raw materials in the invention. In the case of iron-oxide, mined ores may be utilized, or, even more significantly, the waste products from various industries could be utilized as abundant sources of iron-oxide. For instance, flue dust from iron and steel plants would appear to furnish an abundant and inexpensive source of such material. In the case of alumina, bauxite or bauxite fines can be utilized; and, in addition, aluminum dross is also available as a source of this raw material. Sulfate sludges from power plant scrubbers and byproduct gypsum from phosphoric acid and hydroflouric acid industries can be used as a source of sulfate for the cements of the invention. Widely occurring and conventional sources of calcium carbonate, e.g. limestone, are of course readily available as sources of calcium oxide; while many common sources, e.g., sandstone and clays, are available to furnish silica.

It should be noted at this point that it is quite unexpected to discover that large quantities of the ferrite phase, $C_4AF$ yields concretes having excellent high strength characteristics. In fact, published information appears to indicate that the ferrite phase imparts low strength characteristics to hydraulic Portland cements. For instance, Bogue in "The Chemistry of Portland Cement," second edition, Reinhold Publishing Corporation 1955, at page 672, FIG. 28.2, published a graph comparing the compressive strengths of cement compounds. Of the compounds graphed, $C_3S$, beta $C_2S$, $C_5A_3$, $C_3A$, and $C_4AF$; the ferrite phase ($C_4AF$) possessed the lowest compressive strengths. In fact, while $C_3S$ and beta $C_2S$ produced 365 day compressive strengths in the neighborhood of 10,000 psi, $C_4AF$ yielded compressive strengths of about 500 psi. The 7, 28, 90 and 100 day compressive strengths also showed similar differences. Further, F. M. Lea, in "The Chemistry of Cement and Concrete," third edition, Chemical Publishing Company, Inc., at page 83, presented a table (Table VI) tht states the compressive strengths of mortars containing major amounts (85%) of $C_3S$ in combination with beta $C_2S$, $C_3A$, and $C_4AF$. Significantly, the mortars comprising $C_3S$ and $C_4AF$ had compressive strengths (3 days, 7 days, 28 days and 6 months) significantly below the compressive strengths of any other combination tested. A very recent U.S. Pat. to Ost et. al., No. 3,860,433 for "Very Early Strength Cement," issued Jan. 14, 1975, indicates that, generally, addition of iron-oxide to cements of the type containing major amounts of $C_3A_3C\bar{S}$ and chemically unbound $C\bar{S}$ decreased the compressive strengths of the optimum formulations.

By contrast, however, tests on formulation of high iron-oxide hydraulic cements formulated in accordance with the present invention, indicates that said cements have oustandingly excellent early strengths, normal setting times, excellent workability and other characteristics found highly desirable in hydraulic cements. Specific data illustrating the excellent strengths of the present cements is presented hereinafter.

There are three essential compounds in the high iron-oxide cements. Firstly, $C_4AF$ must be present. A range of $C_4AF$ of about 15 to 65% by weight of the cement provides a product exhibiting desired properties. Generally somewhat lesser amounts, i.e., about 10 to 20% by weight of $C_4A_3S$ should also be present, as well as about 10 to 15% by weight of CS. While not essential, it is often desirable to include $C_2S$ in the cement compositions. The $C_2S$ may vary from none at all up to about 50% by weight. Should $C_2S$ be present, the beta crystalline form is necessary, while the gamma form is undesirable. Fortunately, the presence of appreciable amounts of alumina, iron-oxide and sulfate in the compositions and rapid quenching of the clinker ensure that the beta crystalline form is present.

As will be apparent from a review of the Examples hereinafter, altering the compositions appreciably outside of the limits of components set forth above, results in deteriorating properties of the cements. $C_3S$ is unnecessary, and is, in fact, undesirable in part because of the high energy requirement in its preparation, and further because there is no evidence that its presence contributes to the desirable properties of the high iron-oxide cements.

The high iron-oxide cements can be manufactured in a plant similar to conventional Portland cement plants in that all of the unit operations are identical and comprise crushing, grinding, proportioning and heat treating in the conventional manner with conventional equipment.

As previously noted, however, the energy requirements are greatly reduced due to the lower CaO utilized in the high iron-oxide cements; and also because of the lower burning temperatures (2,200°–2,300° F) required to produce the compounds present. Cement kiln refractory limiting life should also be prolonged because of the lower temperatures of burning.

Utilizing conventional Portland cement manufacturing techniques and burning times, a well sintered clinker is produced. This clinker is ground to a fineness of general purpose Portland cement, i.e., 3500–4200 cm²/g Blaine, and can thereafter be bagged for storage or transportation to concrete plants.

The ground product of the high iron-oxide cements has a further advantage in that it has pleasing colors that are distinctively different from the grey color of conventional Portland cements. By varying the iron oxide content and the conditions of heat treatment (oxidizing, neutral, or reducing evironment), it is possible to produce clinkers that are black, brown or buff in color. These cements made from high-$Fe_2O_3$ clinkers when admixed into mortars and concretes can impart pleasing colors to the hardened product without the need for addition of coloring agents to concrete, which often demanded when grey color of conventional Portland cement concrete is to be altered.

The cements of the invention appear to have a further advantage. The presence of high percentages of ferrites appears to produce a tighter bonding with reinforcing ferrous metals. Strong reinforced concrete structures should result from the use of the high iron-oxide cements.

A study was undertaken to elucidate the preferred compositions of the high iron-oxide cements and to more fully understand the role of the compounds $C_4AF$, $C_4A_3\bar{S}$, $C\bar{S}$ and $C_2S$ therein. The results of this study were as follows:

Reagent-grade $CaCO_3$, $Al_2O_3 \cdot 3H_2O$, $Fe_2O_3$, $CaSO_4 \cdot 2H_2O$, and silicic acid were used for the manufacture of cements in the laboratory. The ignition loss of the raw materials was determined at 1000° C for 1 hour. The results, which were used for computing the mix portions of all the cements discussed below are shown below:

| Material | Ignition Loss |
| --- | --- |
| CaCO3 | 44.06% |
| $Al_2O_3 \cdot 3H_2O$ | 35.11% |
| $Fe_2O_3$ | 0.59% |
| $CaSO_4 \cdot 2H_2O$ | 19.40% |
| Silicic Acid | 12.53% |

Unless otherwise specified, the procedure used for making the cements consisted of blending the weighed proportions of the raw materials in a laboratory porcelain jar mill. Thin cakes were made by adding some water and spreading the resulting paste on a sheet-metal tray and drying it. The cakes were stacked on a SiC hearthplate, and the temperature of the furnace was raised so that it took about 4 hours to reach 2200° F. The material was held at 2,200°–2,300° F for a period of 30 to 60 minutes, and the furnace was cooled to 1800° F.

Thereafter, the clinker was removed and allowed to cool quickly in the laboratory air at room temperature until it was cold. The clinker was finally ground in a ball mill to typical Type I Portland cement fineness, 3500–4000 cm²/g Blaine. The preliminary evaluation of the relative hardening characteristic of the cements was done by determining the compressive strength of ½ inch cubes of cement paste (0.28–0.30 water-cement ratio) moist-cured for 5 days.

EXAMPLE I

In order to determine whether, under the burning conditions specified above, hydraulic (setting and hardening underwater) cements can be made that are composed of $C_4AF$ and $C_2S$, but with little or no sulfate present, the two cements shown below in Table I were prepared:

TABLE I

| Cement No. | Burning Temp. °F | Potential Compound Composition % | | | | Oxide Analysis % | | | | |
|---|---|---|---|---|---|---|---|---|---|---|
| | | $C_2S$ | $C_4AP$ | $C_4A_3\bar{S}$ | $C\bar{S}$ | CaO | SiO2 | Al₂O3 | Fe₂O3 | SO₃ |
| A1 | 2300 | 50 | 50 | — | — | 55.6 | 17.4 | 10.5 | 16.4 | — |
| A2 | 2300 | 70 | 25 | 5 | — | 59.0 | 24.4 | 7.8 | 8.2 | 0.6 |

The clinkers of Example I were unstable because they dusted on air cooling. This phenomenon is usually associated with the conversion of $\beta C_2S$ to $\gamma C_2S$. Both the cements A1 and A2 of Example I contained large proportions of the non-hydraulic form of $C_2S$ as shown by the characteristic XRD peaks at 29.6, 32.5, 32.8 and 47.6, 2θ (CuKα). From observation of hydrated cement it was concluded that the cements containing only $\gamma C_2S$ and $C_4AF$, or containing additional small amounts of sulfate (0.6% $\bar{S}$ corresponding to 5% $C_4A_3\bar{S}$) would not yield useful hydraulic compositions.

EXAMPLE II

In order to determine whether an increase in $\bar{S}$ of cement would stabilize the $C_2S$ in the hydraulic 62 $C_2S$ form a number of additional cements were prepared with appreciable amounts of $SO_3$ equivalent to 10–20% $C_4A_3\bar{S}$ and 10–15% $C\bar{S}$. The increase in $C_4A_3\bar{S}$ and $C\bar{S}$ in the cements containing high $C_2S$ was made possible by reducing the $C_4AF$ content correspondingly. These cement compositions are presented in Table II:

TABLE II

| Cement No. | Potential Compound Composition, % | | | | Oxide Analysis, % | | | | | Compressive Strength of Cement Paste 5-day, psi |
|---|---|---|---|---|---|---|---|---|---|---|
| | $C_2S$ | $C_4AF$ | $C_4A_3\bar{S}$ | $C\bar{S}$ | CaO | SiO2 | Al₂O3 | Fe₂O3 | SO3 | |
| B1 | 65 | 15 | 10 | 10 | 56.8 | 22.7 | 8.2 | 5.0 | 7.2 | 6150 |
| B2 | 55 | 15 | 20 | 10 | 54.2 | 19.2 | 13.2 | 5.0 | 8.5 | 11850 |
| B3 | 50 | 15 | 20 | 15 | 53.0 | 17.4 | 13.2 | 5.0 | 11.4 | 12130 |

In contrast to the cements of Example I, the clinkers of Example II were well-sintered, and did not dust on cooling. X-ray diffraction analysis confirmed that the $C_2S$ was present in the hydraulic $\beta$ form. The characteristic peaks due to $C_4A_3\bar{S}$ and $C\bar{S}$ were present, but no peaks due to $C_4AF$ were detected by XRD analysis, although the potential compound compositions showed 15% $C_4AF$ present in all the cements.

It was concluded that 5% $Fe_2O_3$ (corresponding to 15% of $C_4AF$), and 7.2% $SO_3$ (corresponding to 10% $C_4A_3\bar{S}$ and 10% $C\bar{S}$) were adequate to produce hydraulic cements of good strength characteristics. It was also concluded from the results that the early strengths of the $C_2S$–$C_4AF$ cements can be considerably improved by raising the $C_4A_3\bar{S}$ content from 10 to 20%. (See cements B2 and B3).

EXAMPLE III

Several cements were prepared having higher iron-oxide contents and lower dicalcium silicate contents than the cements of Example II. The cement compositions are shown in Table III:

TABLE III

| Cement No. | Potential Compound Composition, % | | | | Oxide Analysis, % | | | | | Compressive Strength of Cement Paste 5-day, psi |
|---|---|---|---|---|---|---|---|---|---|---|
| | $C_2S$ | $C_4AF$ | $C_4A_3\bar{S}$ | $C\bar{S}$ | CaO | SiO2 | Al₂O3 | Fe₂O3 | SO3 | |
| C1 | 40 | 25 | 20 | 15 | 51.1 | 14.0 | 15.3 | 8.2 | 11.4 | 12180 |
| C2 | 25 | 40 | 20 | 15 | 48.3 | 8.7 | 18.4 | 13.1 | 11.4 | 16240 |

The clinkers of Example III were well-sintered and stable and did not dust on cooling. X-ray diffraction analysis showed characteristic peaks due to $\beta C_2S$, $C_4A_3\bar{S}$ and $C\bar{S}$. No free CaO was detected which showed that no dissociation of $C\bar{S}$ had taken place under the condition of the heat treatment, and that all the lime produced from the decomposition of $CaCO_3$ had combined to form the potential compounds. Surprisingly, in spite of high iron-oxide, no sharp peaks due to $C_4AF$ (ferrite solid solution phase) could be detected in the cements by X-ray analysis. This indicated that the ferrite phase was present in a poorly crystalline form, which may account for its unusual activity.

EXAMPLE IV

In order to determine the contribution of $C_2S$ and $C_4A_3\bar{S}$ to high early strengths attained by the cements of the Example III, some cements were made with a low content of the ferrite Phase (0, 5, and 10%). These cements were:

TABLE IV

| Cement No. | Potential Compound Composition, % | | | | Oxide Analysis, % | | | | | Compressive Strength of Cement Paste 5-day, psi |
|---|---|---|---|---|---|---|---|---|---|---|
| | $C_2S$ | $C_4AF$ | $C_4A_3\bar{S}$ | $C\bar{S}$ | CaO | SiO2 | Al2O3 | Fe2O3 | SO3 | |
| D1 | 70 | — | 20 | 10 | 57.0 | 24.4 | 10.0 | 0 | 8.5 | 0 |
| D2 | 65 | 5 | 20 | 10 | 55.9 | 22.7 | 11.1 | 1.6 | 8.5 | 4830 |
| D3 | 60 | 10 | 20 | 10 | 55.1 | 20.9 | 12.1 | 3.3 | 8.5 | 5720 |

Cement D1 was not well-sintered, and contained considerable proportions of a calcium silcosulfate, $(C_2S)_2C\bar{S}$, as determined by its characteristic diffraction peaks. The paste required large amounts of water for normal consistency (40% water by weight of cement), and did not set in 4 days. It was very weak at the 5-day compression test.

The clinkers of D2 and D3 compositions were sintered. However, the cements showed quick-setting tendency, and did not develop high strengths characteristic of the higher ferrite phase (15–40%) cements of Examples II and III, in spite of similar amounts of $C_4A_3\bar{S}$ and $C\bar{S}$ present (20% $C_4A_3\bar{S}$, and 10–15% $C\bar{S}$).

EXAMPLE V

In order to ascertain the effect of the presence of even higher ferrite proportions (than in the cements of Example III) on the strength characteristic of cements, three cements were made with 50–70% potential $C_4AF$. The compound compositions, oxide analyses, and 5 day strength are shown in Table V:

TABLE V

| Cement No. | Potential Compound Composition, % | | | | Oxide Analysis, % | | | | | Compressive Strength of Cement Paste 5-day, psi |
|---|---|---|---|---|---|---|---|---|---|---|
| | $C_2S$ | $C_4AF$ | $C_4A_3\bar{S}$ | $C\bar{S}$ | CaO | SiO2 | Al2O3 | Fe2O3 | SO3 | |
| E1 | 0 | 70 | 20 | 10 | 43.8 | 0 | 24.7 | 23.0 | 8.5 | 11040 |
| E2 | 15 | 55 | 20 | 10 | 46.7 | 5.2 | 21.6 | 18.1 | 8.5 | 12560 |
| F1 | 27 | 51 | 15 | 7 | 49.5 | 9.4 | 18.2 | 16.8 | 6.1 | 12720 |

The clinkers were well-sintered. In the XRD analysis, no $C_2S$ peak was detected in E2, and no $C\bar{S}$ peak was detected in F1. Although F1 contained the characteristic ferrite peak corresponding to 33.9° $2\theta$, both the E1 and E2 cements contained the characteristic ferrite peak at 33.7° $2\theta$ (Cu$\alpha$). This peak corresponds to the composition $C_6AF_2$, i.e., $C_2A + 2C_2F$, but it could also be $C_6A_2F$, i.e., $2C_2A + C_2F$, or $C_4AF$ ($C_2A + C_2F$), containing sulfate ions in solid solution.

EXAMPLE VI

In order to determine the setting and hardening characteristics of the high-$Fe_2O_3$ cements when they are used in making mortars or concretes, large (5–6 lbs. each) batches of composition $C_2$ of Example III, and 3 other cements with varying potential $C_4AF$ were made so that in the 4 cements of this series the amounts of $C_4A_3\bar{S}$ were constant, and only the amount of $C_4AF$ and $C_2S$ were varied. Thus, keeping the potential of $C_4A_3\bar{S}$ at 20%, and $C\bar{S}$ at 15%, the cements had $C_4AF$ contents of 15, 30, 40, 65%, and corresponding $C_2S$ contents of 50, 35, 20, 0%.

The clinkers were made at a maximum temperature of 2200° F (1205 C), with 30-minute hold time at this temperature, in an air-cooled electric furnace (Globar). All the clinkers were well sintered. No uncombined CaO was detected in the X-ray diffraction patterns. No additions or admixtures were added during grinding of the clinkers in a laboratory ball mill to fineness typical of the ASTM Type 1 Portland cements (3,500–4,200 cm²/g Blaine).

The setting and hardening characteristics of the cements were evaluated by the ASTM standard procedure, C109. Graded Ottawa sand in a proportion of 2.75 to 1.0 by weight of cement was used in making mortars with 0.5 water-cement ratio. Some cubes were demolded at 8 hours to determine their compressive strength. The mortars showed excellent workability and normal time of set, except the mortar made from the Cement C2-C, which was slower setting.

The potential compound compositions, the oxide analyses and test results are presented in Table VI:

TABLE VI

| Cement No. | Potential Compound Composition, % | | | | Oxide Analysis, % | | | | | Compressive Strength of 2 in. ASTM C109 Mortar Cubes, psi. | | | |
|---|---|---|---|---|---|---|---|---|---|---|---|---|---|
| | $C_2S$ | $C_4AF$ | $C_4A_3\bar{S}$ | $C\bar{S}$ | CaO | SiO2 | Al2O3 | Fe2O3 | SO3 | 8Hr | 1d | 3d | 7d |
| C2-A | 50 | 15 | 20 | 15 | 53.0 | 17.4 | 13.2 | 5.0 | 11.4 | 1120 | 2280 | 3100 | 3340 |
| C2-B | 35 | 30 | 20 | 15 | 50.2 | 12.2 | 16.3 | 9.9 | 11.4 | 1000 | 4260 | 4490 | 4550 |
| C2 | 25 | 40 | 20 | 15 | 48.3 | 8.7 | 18.4 | 13.2 | 11.4 | 120 | 5040 | 5350 | 5420 |
| C2-C | 0 | 65 | 20 | 15 | 43.9 | 0 | 23.6 | 21.4 | 11.4 | 0 | 3990 | 4380 | 4500 |

It is obvious from the data, that, at a fixed content of $C_4A_3\bar{S}$ and $C\bar{S}$, the 1-day compressive strengths went up as the potential $C_4AF$ rose from 15 to 40%. As compared with the 40% $C_4AF$-cement, the 1-day strength was somewhat lower in the 65% $C_4AF$-cement.

Since the $C_4A_3\bar{S}/C\bar{S}$ ratio of the cements was such that on hydration 75% of the $C_4A_3\bar{S}$ present would form the monosulfate hydrate (rather than expansive trisulfate hydrate or ettringite), the cements of the Example VI would not be expansive unless additional sulfate is provided for the formation of substantial qualities of ettringite. In order to test the potential expansion, ASTM C109 mortars made from each of the two cements, C2 and C2-B, were cast into restrained 2 by 2 by 10 inch prisms (Proposed ASTM Standard Procedure for Expansive Hydraulic Cements), which were demolded at 9 hours and immersed in line water after taking initial length measurements. The linear expansions after 7 days of continuous immersion were insignificant in both the cements (less than 0.005%). The proposed ASTM specifications for expansive hydraulic cements require a minimum of 0.04% expansion from the restrained mortar prisms.

EXAMPLE VII

Cements C2 and C2-B of Example VI were also used for making concrete. A Type I Portland cement was used as control. Locally available Eliot sand of 2.94 Fineness Modulus, and $\frac{1}{2}$-$\frac{1}{4}$ inch Fair Oaks Gravel were used as aggregates. Concrete mix proportions were based on 658 lbs. cement per cu. yd. of concrete, 0.40 water-cement ratio, and 0.50 sand-gravel ratio by weight. Although the slump was about 1 inch, the concretes containing the high-$Fe_2O_3$ cements showed excellent workability and cohesiveness.

For determination of compressive strength, the concrete mixtures were cast into 2 inch diameter by 4 inch cylindrical sheet-metal cans. The cans were sealed and stored at 70° F. The concrete cylinders were demolded at age 1-day, and tested for compressive strength by standard test procedures. Some demolded cylinders were stored at 70° F in a fog room fo 3d and 7d strength measurements. The test results were:

TABLE VII

| Cement Type | Compressive Strength of 2 by 4 inch Concrete Cylinders, psi | | |
|---|---|---|---|
| | 1 day | 3 days | 7 days |
| Control, Portland Type I | 1470 | 3180 | 4270 |
| C2 | 5670 | 6800 | 7020 |
| C2-B | 5270 | 5800 | 5880 |

From the above data on the properties of the high-$Fe_2O_3$ cements of the Examples VI and VII, it is obvious that hydraulic cements containing 15-16% potential $C_4AF$, 20% $C_4A_3\bar{S}$, 15% $C\bar{S}$, and remainder $\beta C_2S$ can be manufactured with significantly lower CaO content and at a considerably lower temperature of heat treatment than normal Portland cements.

As compared with the 60-65% CaO (to be produced from the decomposition of $CaCO_3$) in Portland cements, the equivalent CaO needed for the formation of $C_2S$, $C_4AF$, and $C_4A_3\bar{S}$ is only 35-45%. It should be noted that no CaO is needed for the formation of $C\bar{S}$ which is produced from dehydration of gypsum present in the mixture of raw materials used for making the cements of this invention. Thus, deducting 6.2% CaO (corresponding to 15% $C\bar{S}$ present) from the total CaO present in the clinker, the CaO to be obtained from decomposition of $CaCO_3$ is 44%, 42.1% and 37.7%, respectively, for cements C2-B, C2 and C2-C. Assuming 40% average CaO, the heat required for CaO formation from $CaCO_3$ is about 300 Kcal/Kg, which, when compared with Portland cement clinker burning, represents an energy saving in the order of 150 Kcal/Kg. Further, if about 50 Kcal/Kg are saved due to the lower burning temperature (reduced radiation losses at 2,200° F), a modern dry process cement plant with 800 Kcal/Kg heat consumption for Portland cement manufacture can save 25% of the heat energy by switching over to the high iron-oxide hydraulic cements of this invention.

EXAMPLE VIII

Although the cement compositions containing 20% $C_4A_3\bar{S}$ and 15% $C\bar{S}$ gave highest early strengths, it is obvious from the previous examples as well as from the test data below that some variations in the proportions of $C_4A_3\bar{S}$ and $C\bar{S}$ can be made in the cements of the invention without major adverse effects on the setting and hardening characteristics of the cements. These additional cement samples and test results are shown in Table VIII:

TABLE VIII

| | Potential Compound Composition, % | | | | Oxide Analysis, % | | | | | Compressive Strength of 2 in. ASTM C109 Mortar Cubes, psi. | | | |
|---|---|---|---|---|---|---|---|---|---|---|---|---|---|
| No. | $C_2S$ | $C_4AF$ | $C_4A_3\bar{S}$ | $C\bar{S}$ | CaO | SiO2 | $Al_2O_3$ | $Fe_2O_3$ | SO3 | 8HR | 1d | 3d | 7d |
| F1-A | 25 | 50 | 15 | 10 | 49.0 | 8.7 | 18.0 | 16.5 | 8.7 | — | — | 3410 | 3500 |
| G1 | 45 | 15 | 20 | 20 | 51.8 | 15.7 | 13.1 | 5.0 | 14.4 | — | 1380 | 2800 | 3930 |
| G2 | 30 | 30 | 20 | 20 | 49.0 | 10.5 | 16.3 | 9.9 | 14.4 | 2270 | 4100 | 4940 | 5080 |
| G3 | 0 | 60 | 20 | 20 | 43.3 | 0 | 22.6 | 19.7 | 14.4 | 900 | 3840 | 4480 | 4480 |

The cements of the invention do not have to be ground to excessive fineness to obtain high strengths at very early ages. In fact, mortars gave 900-2270 psi strength at 8-hours when the cements contained 15 or 30% potential $C_4AF$ (note cements G2, G3, C2-A and C2-B, above). These cements containing 30 to 65% potential $C_4AF$ (note cements G2, G3, C2, C2-B, and C2-C above) gave 3840-5040 psi compressive strength in 1-day old mortar cubes. Similarly, normal concrete mixtures containing cements of 30 to 40% potential $C_4AF$ gave 5270 and 5670 psi compressive strength at age 1-day, and 6800 psi, 5800 psi at 7-day respectively. Thus, the high-iron cements containing appropriate amounts of calcium sulfoaluminate, calcium sulfate and $\beta C_2S$, are ideally suited for the manufacture of precast and prestressed concrete products without the need for accelerated hardening by steam curing, which is the current practice for Portland cement concretes.

What is claimed is:

1. High iron-oxide hydraulic cement compositions comprising from about 15 to about 65% by weight tetracalcium aluminoferrite, from about 10 to about 20% by weight tetracalcium trialuminosulfate, and from about 10 to about 15% by weight calcium sulfate.

2. The hydraulic cement composition of claim 1 wherein tetracalcium alumino ferrite is present in the form of dicalcium aluminate-dicalcium ferrite.

3. The hydraulic cement compositions of claim 1 further including from about0 to about 50% by weight dicalcium silicate.

4. The composition of claim 3 wherein the iron is present essentially in the form of tetracalcium aluminoferrite; calcium is essentially in the form of tetracalcium aluminoferrite, tetracalcium trialuminosulfate, calcium sulfate, and dicalcium silicate; aluminum is essentially in the form of tetracalcium aluminoferrite and tetracalcium trialuminosulfate; and sulfate is essentially in the form of tetracalcium trialuminosulfate and calcium sulfate; and silicon is present in the form of dicalcium silicate.

5. The composition of claim 4 wherein dicalcium silicate is present essentially in the beta crystalline structure.

6. A method for producing high iron-oxide hydraulic cement clinker comprising mixing predetermined amounts of iron-oxide, aluminum-oxide, calcium oxide, and sulfate raw materials, subjecting said raw materials to a heat treatment at temperatures of about 2,200°–2,300° F for a period of time sufficient to form clinkers comprising an admixture of from about 15 to about 65% tetracalcium aluminoferrite, from about 10 to about 20% tetracalcium trialuminosulfate, and from about 10 to about 15% calcium sulfate, and thereafter cooling the clinker.

7. The method of claim 6 wherein silicon containing raw materials are used and the clinker includes up to about 50% dicalcium silicate.

8. The method of claim 6 including the further steps of grinding the clinker to a fineness of about 3500 to 4200 $cm^2/g$ Blaine.

9. A method for reducing the energy required to produce an hydraulic cement clinker comprising reducing the amount of CaO required in the cement composition and replacing the reduced amount of CaO with additional amounts of iron-oxide, alumina and sulfate in the form of tetracalcium aluminoferrite tetracalcium trialuminosulfate and calcium sulfate.

* * * * *